Dec. 22, 1925.  
W. B. LASKEY  
FILLED CANDY  
Filed April 7, 1924  
1,566,329
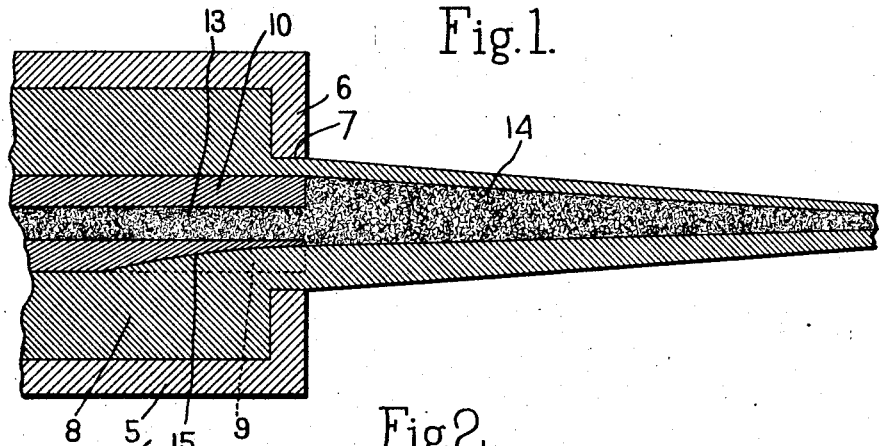
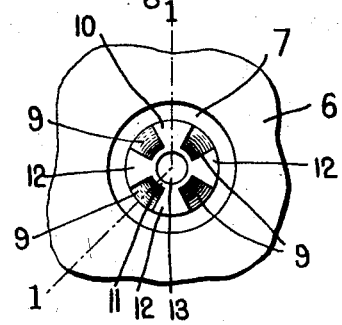
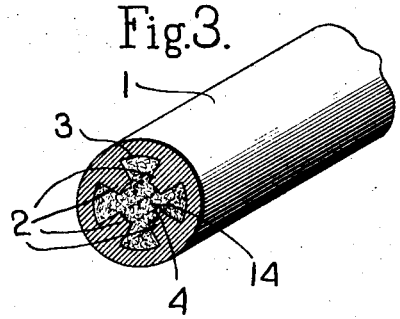
Inventor.  
William B. Laskey  
by Heard, Smith & Tennant  
Attys.

Patented Dec. 22, 1925.

1,566,329

UNITED STATES PATENT OFFICE.

WILLIAM B. LASKEY, OF BROOKLYN, NEW YORK.

FILLED CANDY.

Application filed April 7, 1924. Serial No. 704,598.

*To all whom it may concern:*

Be it known that I, WILLIAM B. LASKEY, a citizen of the United States, and resident of Brooklyn, county of Kings, State of New York, have invented an Improvement in Filled Candies, of which the following description, in connection with the accompanying drawing, is a specification, like characters on the drawing representing like parts.

This invention relates to so-called "filled" candy, that is, candy in tubular or cellular form having the interior of the tubes or cells filled with some filling material such, for instance, as peanut butter.

One of the objects of the present invention is to provide a filled candy in tubular form which has projections extending inwardly from the inner walls of the tubes or cells. These projections serve both as a means for giving additional strength to the cellular candy and also as a means for increasing the proportion of candy material to the filling, or in other words, reducing the amount of filling in proportion to the candy material.

Filled candy in tubular form is sometimes made by extruding candy material in tubular form from an extruding machine and at the same time introducing the filling into the candy tube as it is formed. The extruding process can be more easily carried out if the candy tube which is formed by the extruding die is of a relatively large size. Such a candy tube, however, may contain too great a proportion of filling, and an advantage which results from my invention is that the presence of the projections on the interior of the candy tube reduces the space into which the filling may be inserted and thereby reduces the proportion of filling to candy material in a given length of tube.

In order to give an understanding of my invention I have illustrated herein a selected embodiment thereof which will now be described, after which the novel features will be pointed out in the appended claim.

Fig. 1 is a sectional view through the extruding die of an extruding machine which is constructed to form a candy tube embodying my invention, said section being taken on substantially the line 1—1, Fig. 2;

Fig. 2 is a fragmentary end view of the extruding die showing the form of the opening through which the candy material is extruded;

Fig. 3 is a perspective view of a piece of tubular candy embodying my invention.

It will be understood that the drawings show the extruding machine and the candy tube on an enlarged scale, this being done in order to avoid possible confusion.

The piece of candy embodying my invention shown in Fig. 3 is indicated at 1 and it has a tubular formation and is provided with projections extending inwardly from the walls thereof. These projections may have various forms and shapes without departing from the invention. In the construction shown in Fig. 3 the projections are in the form of ribs 2 which extend inwardly from the wall 3 of the candy tube and which partially fill the opening or bore 4 of said tube. This candy tube when completed may be filled with a suitable filling material 14, such for instance as peanut butter, as is commonly done in filled candy.

While so far as the invention is concerned the candy illustrated in Fig. 3 might be formed in any suitable way, I have shown in Fig. 1 a device for forming said candy by the extruding process. In Fig. 1, 5 indicates the cylinder of an extruding machine having at one end a die member 6 provided with an opening 7 through which candy material 8 may be extruded. In order to extrude candy of the form shown in Fig. 3 this opening 7 will have an annular shape provided with inwardly extending portions 9. This shape of opening is formed by the use of a core 10 having a central portion 11 and radially extending arms 12, the space between the arms forming the indentations or portions 9. This core is retained in any suitable way and is provided with a central duct 13 through which the filling material 14 is forced so that said filling material will be filled into the interior of the tube 1 as it is delivered from the die. This form of die will produce a tubular candy having the ribs 2 extending inwardly from the wall thereof and will also fill the interior of the candy tube with the filling material 14. This candy tube may be drawn or pulled after it is delivered from the extruding machine to reduce it to the desired diameter, this being a common practice in the manufacture of candy.

While I have shown in Fig. 1 one particular form of apparatus adapted to make a candy tube of the particular shape shown in Fig. 3, yet I wish to state that the invention is not limited to candy of this particular shape, nor to the use of the extruding machine shown in Fig. 1 for the manufacture of the candy.

The core with the arms 12 may be conveniently made by taking a tube having an external diameter equal to the diameter of the arms 12 and milling or otherwise forming slots or notches 15 in the end thereof thereby to produce the spaces 9.

Having thus described the invention, what I claim as new and desire to secure by Letters Patent, is:

A piece of candy in tubular form having flat-faced strength-giving ribs of considerable thickness projecting radially inwardly from the wall thereof, the interior of the candy being filled with suitable filling material.

In testimony whereof, I have signed my name to this specification.

WILLIAM B. LASKEY.